United States Patent [19]

Molnar

[11] 4,275,923
[45] Jun. 30, 1981

[54] VEHICLE CUSHION

[75] Inventor: Thomas G. Molnar, Melbourne, Australia

[73] Assignee: Repco Limited, Melbourne, Australia

[21] Appl. No.: 961,922

[22] Filed: Nov. 20, 1978

[51] Int. Cl.³ .............................................. A47D 1/10
[52] U.S. Cl. .................................... 297/250; 297/483
[58] Field of Search .................... 297/250, 254–256, 297/253, 488, 464, 456, DIG. 1, DIG. 2, 483

[56] References Cited

U.S. PATENT DOCUMENTS

| | | | |
|---|---|---|---|
| 2,888,976 | 6/1959 | Hart | 297/250 |
| 3,207,552 | 9/1965 | Loughney | 297/250 |
| 3,220,769 | 11/1965 | Regan | 297/456 X |
| 3,707,008 | 12/1972 | Fellin et al. | 297/250 X |
| 3,713,695 | 1/1973 | Von Wimmersperg | 297/487 |
| 3,761,130 | 9/1973 | Suzuki et al. | 297/DIG. 2 |
| 3,934,934 | 1/1976 | Farrell, Jr. et al. | 297/250 |
| 3,957,303 | 5/1976 | Mauron | 297/488 X |
| 3,964,787 | 6/1976 | Labadie et al. | 297/488 |
| 3,992,056 | 11/1976 | Koziatek et al. | 297/250 |
| 4,159,127 | 6/1979 | Czernakowski et al. | 297/464 |

FOREIGN PATENT DOCUMENTS 2347010 11/1976 France.

*Primary Examiner*—Francis K. Zugel
*Attorney, Agent, or Firm*—Stevens, Davis, Miller & Mosher

[57] ABSTRACT

A cushion for location on a vehicle seat to provide an elevated seating surface for a child, and having upstanding side walls. A recess is formed in the front edge of each side wall for receiving part of the normal vehicle seat safety belt, and that recess is increased in depth downwardly at a location spaced from the front edge of the side wall so as to resist separation of the belt from the cushion. The effective height of the cushion can be increased by locating a temporary elevating platform beneath the cushion or over its upper surface. The body of the cushion comprises a metal frame, a core of resilient material moulded around that frame, and an outer skin covering the core.

7 Claims, 11 Drawing Figures

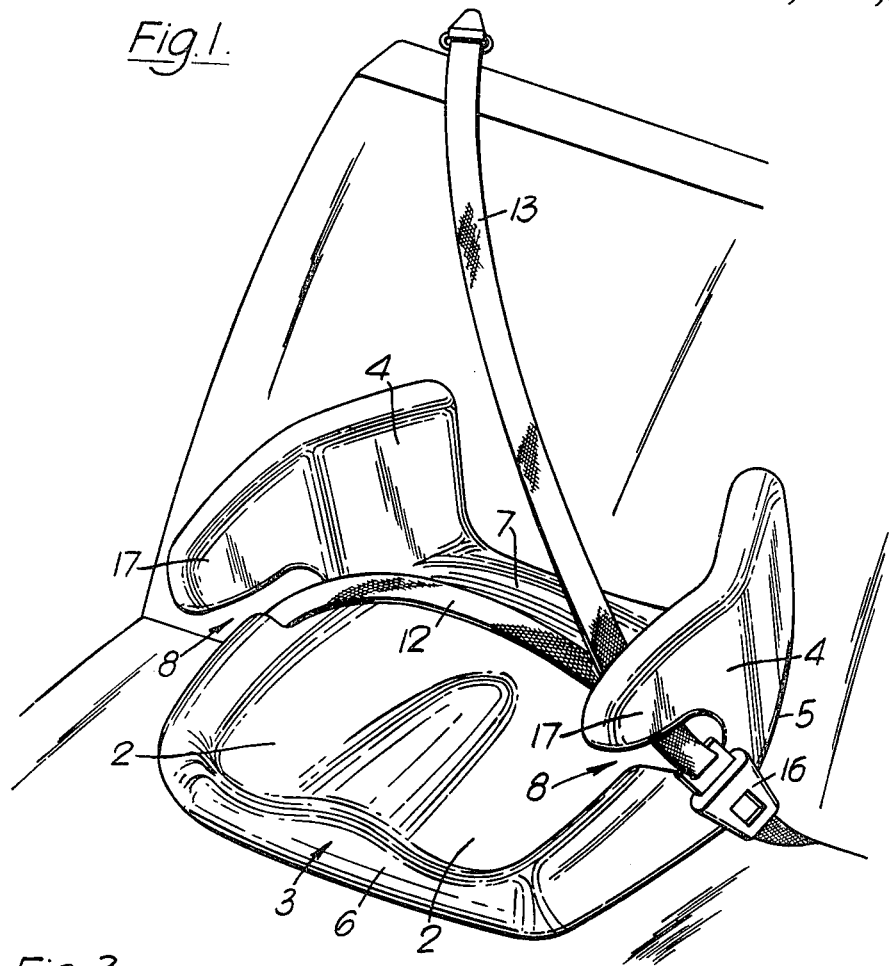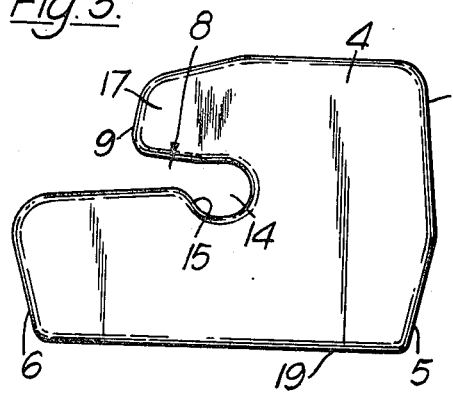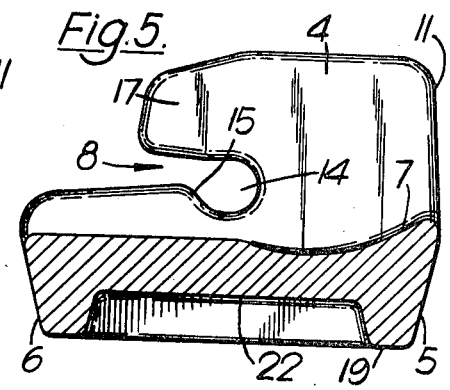

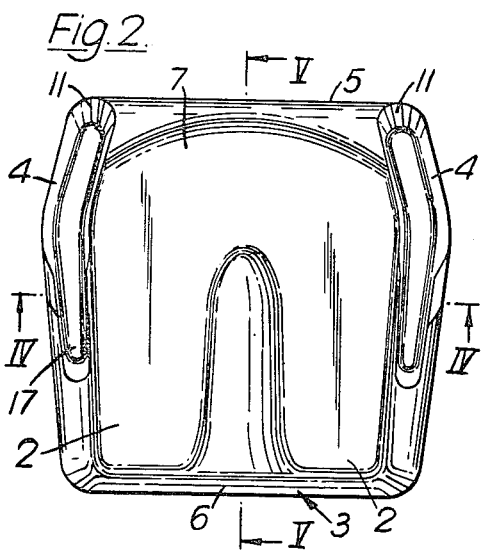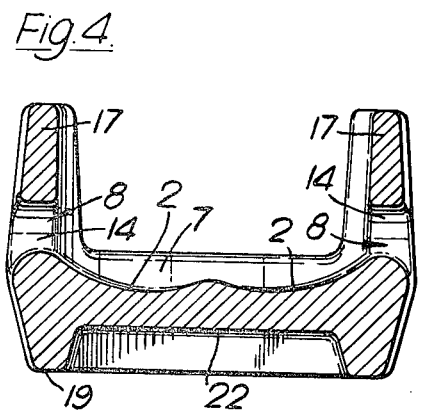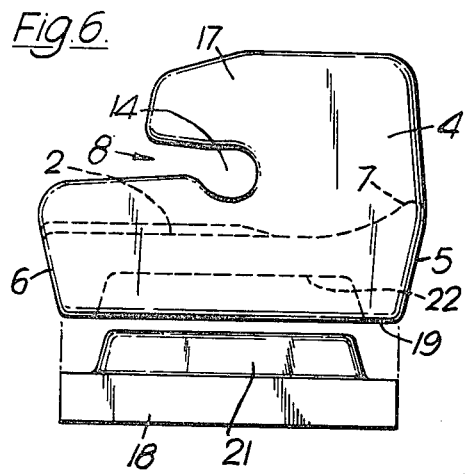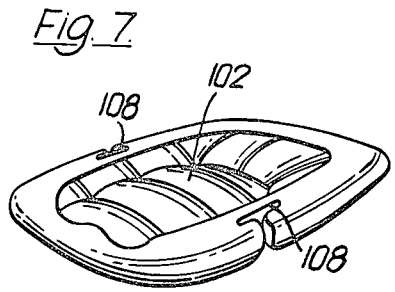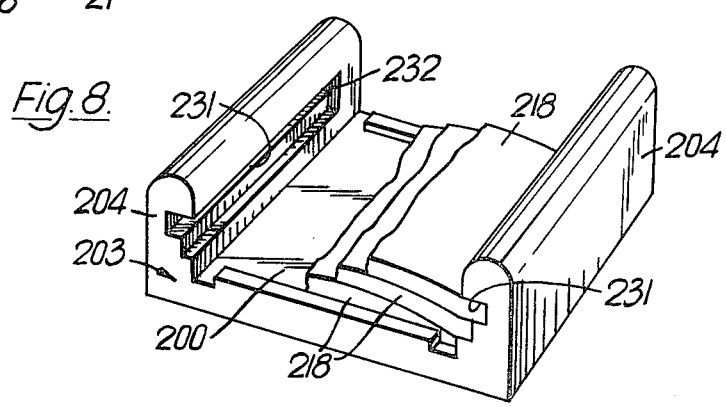

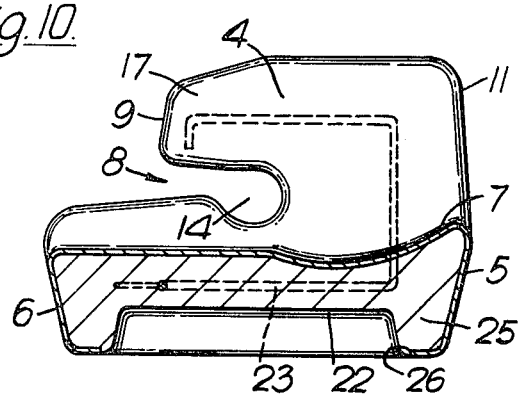
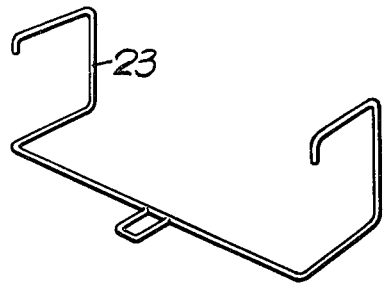
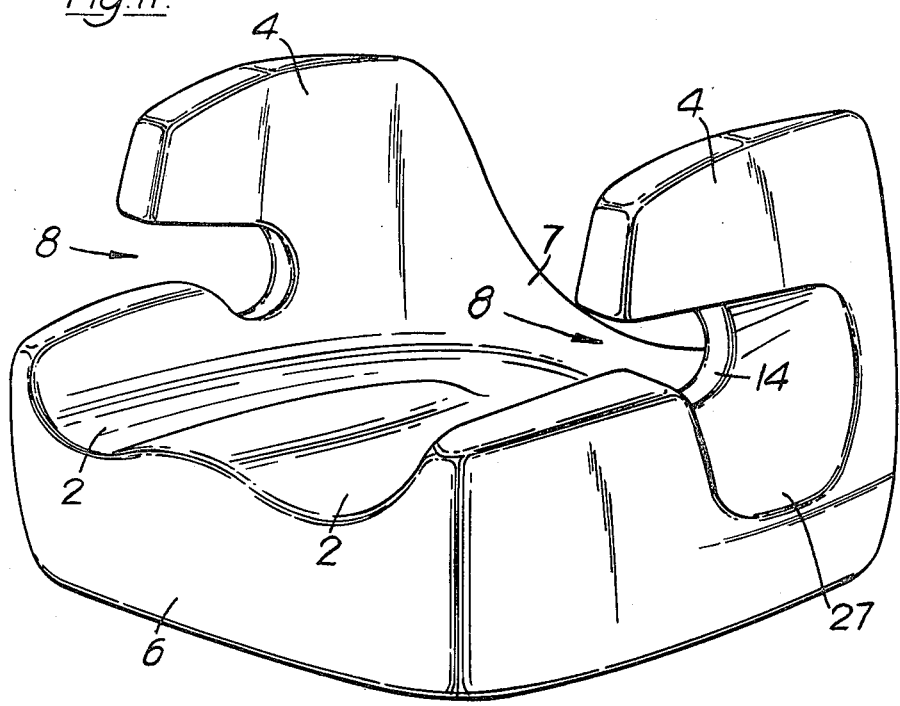

VEHICLE CUSHION

This invention relates to means for supporting a child on a vehicle seat while under the restraint of a safety belt or harness.

Normal adult safety belts of the lap-sash type cannot be conveniently used to restrain a child located on a vehicle seat because the sash will not cross the child's body at a comfortable or safe location. It is an object of the present invention to overcome or alleviate that difficulty by providing a cushion which can be placed on a vehicle seat to support a child. The depth of the cushion is such that a child supported thereon is better positioned for retention by an adult sash strap. If desired, the cushion may be arranged so that the depth can be varied to suit circumstances.

According to the present invention, there is provided a cushion for location on a vehicle seat and having, an upper surface for seating engagement by an occupant of the vehicle, and a recess at or adjacent each of two opposite sides of said cushion for receiving a respective part of a safety belt or harness so as to restrain said cushion against movement off said vehicle seat.

The essential features of the invention, and further optional features, are described in detail in the following passages of the specification which refer to the accompanying drawings. The drawings however, are merely illustrative of how the invention might be put into effect, so that the specific form and arrangement of the features (whether they be essential or optional features) shown is not to be understood as limiting on the invention.

In the drawings:

FIG. 1 is a perspective view of one embodiment of the invention shown located on a vehicle seat;

FIG. 2 is a plan view of the cushion shown in FIG. 1;

FIG. 3 is a side elevational view of the cushion shown in FIG. 1;

FIG. 4 is a sectional view taken along line IV—IV of FIG. 2;

FIG. 5 is a sectional view taken along line V—V of FIG. 2;

FIG. 6 is a sectional view of the cushion of FIG. 1 shown in association with a booster section;

FIG. 7 is a perspective view of a further embodiment of the invention;

FIG. 8 is a perspective view of yet another embodiment of the invention;

FIG. 9 is a perspective view of a metal frame for use in one form of cushion construction;

FIG. 10 is a cross-sectional view similar to FIG. 5 and showing a preferred type of construction incorporating the metal frame of FIG. 9;

FIG. 11 is a perspective view of the cushion shown in FIG. 10.

In the particular construction shown in FIG. 1, the upper surface 2 of the cushion base 3, is contoured to provide a comfortable seating surface for the occupant. An upstanding side wall 4 is provided at each of two opposite sides of the cushion base 3 and each wall 4 extends from the rear edge 5 of the cushion base 3 to adjacent the front edge 6. It is generally not necessary or desirable to provide a rear wall for the cushion, although in the construction shown, there is a slight upturn 7 at the rear of the base 3 which arises out of the contouring of surface 2 (see FIG. 3).

A recess or slot 8 is formed through the front edge 9 of each wall 4 and extends rearwardly, but terminates before the rear edge 11 of the wall 4. As seen in FIG. 1, each slot 8 is adapted to receive a respective part of a lap strap 12 of a safety belt, and one of the slots 8 also receives part of a sash strap 13. The depth of the rear end portion 14 of each slot 8 is increased downwardly to create a forwardly facing shoulder 15 which resists removal of the straps 12 from the slots 8. It will be appreciated that the slots 8 will function equally well with safety harnesses and other forms of belts restraints different to that particularly shown in FIG. 1. For example, a child's safety harness may be used in association with a conventional lap strap.

The arrangement shown in FIG. 1 has the further advantage that the safety belt buckle 16 is located outside the cushion, and the adjacent side wall 4 protects that buckle 16 against inadvertent release by a child seated on the cushion. There are several other advantages of the arrangement, the basic one being that a child seated on the cushion is located at a more comfortable level for viewing the surroundings. More important however, is the fact that in the resulting elevated position, the sash strap 13 crosses the child's body at a comfortable and relatively safe position. In that regard, the geometry of the sash strap 13 is advantageously influenced by the overhang 17 of the side wall 4 adjacent the buckle 16. A further consequence of the arrangement shown, is that the lap strap 12 is located, by the slots 8, so as to pass across the thighs of the child, whereas it would pass across soft tissue areas of the child if not so restrained. As a result, there is less likelihood of injury to the child in the event of sudden deceleration of the vehicle. Still further, in the event of such deceleration, the cushion will tend to pivot about the lap strap 12 such that the front edge 6 of the base 3 is urged upwards, and that increases the retention effect of the strap 12 on both the cushion and the child occupant.

A cushion as described can be formed of any suitable material, or combination of materials. In a preferred method of manufacture however, the cushion is formed by first producing an outer skin or covering which is flexible but has sufficient strength to retain its shape when filled with a core material. That outer skin or covering preferably forms the entire outer surface of the cushion apart from an opening through which the core material may be introduced, and may be formed by rotational moulding of a suitable material such as polyvinylchlorine while curing the material in an oven to set it in the moulded shape. A metal frame 23 as shown in FIG. 9 is then positioned within the skin or covering 24 so as to be located as shown in FIG. 10. Any suitable means may be employed to retain the frame 23 and skin or covering 24 in the correct relationship. The hollow interior of the skin or covering 24 is then filled with a suitable resilient core material 25 such as polyurethane, which may be introduced in liquid form through the opening 26 of the skin or covering 24 and then activated to foam or expand to fill the available space. In that way the skin or covering 24 is retained in the desired shape and the frame 23 is secured against relative movement. A strong, serviceable, and lightweight construction results.

The completed cushion is shown in FIG. 11, and preferably has a shallow recess 27 in the outer surface of each side wall 4 and which extends downwardly and rearwardly from the respective slot portion 14. The recess 27 is designed to at least partially accommodate the buckle of an adult safety belt and thereby reduce possible contact of that belt with a child occupant of the cushion. It also contributes towards obtaining a suitable geometry for the safety belt.

It may be desirable to provide means whereby the effective (seating) height of the cushion can be varied to suit different requirements. That is, the desirable degree of elevation will vary according to the age of the child who is to use the cushion. One such means is shown in FIG. 6, and involves the use of a booster section 18 which is locatable beneath the undersurface 19 of the cushion base 3 so as to elevate the height of the seating surface 2. Two or more booster sections 18 may be used if required. The cushion base 3 and booster section 18 may be restrained against separation in many different ways. In the FIG. 6 arrangement, that is achieved by a spigot portion 21 on the upper side of the booster section 18 and which is adapted to locate within a substantially complementary recess 22 formed in the undersurface 19 of the base 3. Obviously, the relative positions of the spigot portion 21 and recess 22 can be reversed. If two or more booster sections 18 are to be used in combination, each may be provided with a recess within its lower side, which is comparable with the recess 22 of the cushion base 3.

The basic concept of the invention can be adopted in various forms. FIG. 7, for example, shows an embodiment alternative to that of FIGS. 1 to 6, and items of that embodiment comparable with items of the FIGS. 1 to 6 embodiments are given a like reference numeral except that they are in the series 100 to 199.

In the FIG. 7 construction, the cushion is recessed or otherwise contoured at its upper surface 102 to comfortably accommodate a child, and means is provided at each of two opposite sides for releasably attaching the lap strap (not shown) of an adult safety belt. In the example shown, each such means comprises a T-shaped slot 108 extending between the upper and lower surfaces of the cushion. It is to be understood however, that the cushion could be held to a vehicle seat by way of a special strap provided for that purpose rather than by an adult lap strap, and the same attaching means can be used in either case. Furthermore, the cushion can be used with an adult safety belt which has its sash strap geometry modified in the manner described in Australian patent application No. 14430/76.

A cushion according to the invention may be used in combination with an auxiliary unit which provides both the backrest and sides for a complete child's safety seat. That is, a complete safety seat results from the combination of the cushion and such a unit, and that safety seat can be releasably secured to a vehicle seat in any appropriate manner. For example, the top of the unit backrest can be attached to the vehicle parcel shelf through means such as described in either of Australian patent applications Nos. 19075/76 and 19080/76.

The cushion and auxiliary unit combination can be used with very young children (e.g. 6-24 months) and the cushion alone can be used with older children (e.g. 2-11 years).

As in the previously described embodiment, the cushion of FIG. 7 may be of fixed or adjustable depth—i.e., the effective distance between its upper and lower surfaces. That adjustment could be achieved in a manner similar to that shown in FIG. 6, but other arrangements are clearly available.

Yet another embodiment of the invention is shown in FIG. 8, and that is a particular form of adjustable cushion in which a base member 203 is arranged to removably receive a cushion section 218, or a plurality of such sections 218 located one above the other. Thus, the effective cushion depth can be varied by removal or addition of the cushion sections 218, and in the minimum depth condition the base 203 alone may be used if it is sufficiently resilient at its upper surface for comfortable seating.

The base member 203, in the construction shown, includes a platform part 200 and upstanding side walls 204 at each of two opposite sides of the platform part 200. Cushion portions 218 can be located in overlying relationship on the platform part 200 and between the side walls 204, and any suitable means can be provided to releasably retain one or more of the portions 218 in that position. As shown, that means may include an inwardly projecting lip 231 at the upper edge of each side wall 204, which serves to resist removal of a cushion section 218 through the top of the base member 203. An upright abutment shoulder 232 is provided at the forward edge portion of each side wall 204 for engagement by the front edge of each cushion section 218, so that removal and replacement of cushion sections 218 must be effected through the back of the base member 203, which in use is located against the backrest of the vehicle seat.

Instead of using overlying cushion sections 218 to vary the effective depth, the base member 203 may be adapted to receive either one of a plurality of sections, each of which has a different depth. In that alternative arrangement, the total effective depth of the cushion is varied by substitution rather than by addition or removal of cushion sections.

It will be appreciated from the foregoing that the present invention provides an improved means for supporting a child safely on a vehicle seat. The cushion enables a child to be supported at a height such as to permit a view through the vehicle window, and the relatively large area of engagement between the cushion and vehicle seat tends to guard against slipping on the vehicle seat. Furthermore, the cushion permits optimum use of existing adult safety belts.

Finally it is to be understood that various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. A cushion used in combination with a vehicle seat provided with a combination lap and sash safety belt, said cushion comprising a base having an upper seating surface, two wall portions on respective opposite sides of said base and projecting above said seating surface so as to form arm rests, and means in each said wall portion for holding the lap portion of said safety belt forward of and above its normal position on the vehicle seat and cooperating with said lap portion to hold the cushion on the vehicle seat, the said means of one said wall portion also being operative to hold a lower part of the sash portion of said safety belt down and forward relative to the back of the vehicle seat to accommodate therebetween an occupant of the cushion, said means comprising a slot in the respective said wall portion which has its open mouth facing towards the front of said cushion and which extends rearwardly from that open mouth to terminate at a closed end, said lap portion being receivable in both said slots and said sash portion being receivable in one said slot only.

2. The combination according to claim 1, wherein said upper seating surface of said cushion is recessed to provide a contoured seating surface.

3. The combination according to claim 1, wherein the distance between the upper and lower edges of each said slot in said cushion is increased at a rear end portion of the slot, and that increase is in a direction downwards towards the undersurface of said cushion.

4. The combination according to claim 1, wherein said cushion further comprises at least one removable section which is locatable beneath the undersurface of said cushion to elevate said upper surface thereof to thereby vary the height of said cushion, said undersurface being provided with a recess to receive a spigot portion of said removable section.

5. The combination according to claim 1, wherein the body of said cushion comprises an outer covering, a core which fills the hollow interior of said covering and is formed of a resilient material, and a metal frame also contained within said covering and around which said core material is moulded.

6. The combination according to claim 1, wherein said cushion base comprises the sole means interconnecting said wall portions and an opening separates said wall portions at the back of said cushion.

7. A method of forming a cushion, including the steps of: rotary moulding an outer covering of the desired configuration, heat curing the outer covering during the moulding step, locating a metal frame within the hollow interior of the moulded covering, and filling the hollow interior of the covering with an expanded resilient material so that the metal frame is surrounded by that material.

* * * * *